United States Patent [19]

Masuda et al.

[11] Patent Number: 4,690,994
[45] Date of Patent: Sep. 1, 1987

[54] HIGH MOLECULAR WEIGHT FLUOROELASTOMER

[75] Inventors: Yoshinori Masuda, Nobeoka; Hiroshi Saito, Chiba; Hiroshi Kobayashi, Yokohama, all of Japan

[73] Assignee: Asahi Kasei Kogyo Kabushiki Kaisha, Osaka, Japan

[21] Appl. No.: 804,772

[22] Filed: Dec. 5, 1985

[30] Foreign Application Priority Data

Dec. 26, 1984 [JP] Japan .................................. 59-273338
May 14, 1985 [JP] Japan .................................. 60-102239
Sep. 4, 1985 [JP] Japan .................................. 60-195617
Sep. 9, 1985 [JP] Japan .................................. 60-199015

[51] Int. Cl.$^4$ ............................................. C08F 14/22
[52] U.S. Cl. ..................................................... 526/254
[58] Field of Search ......................................... 526/254

[56] References Cited

U.S. PATENT DOCUMENTS

| | | | |
|---|---|---|---|
| 3,051,677 | 8/1962 | Rexford | 526/254 |
| 3,056,767 | 10/1962 | Pailthorp | 526/254 |
| 3,069,401 | 12/1962 | Gallagher | 526/254 |
| 3,194,796 | 7/1965 | Squire | 526/254 |
| 3,839,305 | 10/1974 | Moore . | |
| 3,845,024 | 10/1974 | Weaver . | |
| 4,027,086 | 5/1977 | Lo Valvo | 526/254 |
| 4,123,603 | 10/1978 | Stewart | 526/254 |
| 4,549,921 | 10/1985 | Wolfe | 526/254 |

Primary Examiner—Paul R. Michl
Attorney, Agent, or Firm—Birch, Stewart, Kolasch & Birch

[57] ABSTRACT

A high molecular weight fluoroelastomer is provided comprising 65 to 100 wt % of vinylidene fluoride units and hexafluoropropylene units and 35 to 0 wt % of tetrafluoroethylene units exhibiting low compression set and high elongation properties and showing good processability.

14 Claims, 2 Drawing Figures

HIGH MOLECULAR WEIGHT FLUOROELASTOMER

BACKGROUND OF THE INVENTION

This invention relates to a novel vinylidene fluoride fluoroelastomer having a high molecular weight. The present fluoroelastomer has both low compression set and high elongation properties and shows good processability in spite of a high molecular weight.

There have been proposed hitherto various kinds of vinylidene fluoride fluoroelastomers characterized in the amount of monomeric units. For example, Japanese Patent Publication No. 7394/1958 discloses a copolymer of 40 to 85 wt % of hexafluoropropylene (denoted as HFP hereinafter) units and 60 to 15 wt % of vinylidene fluoride (denoted as VdF hereinafter) units. U.S. Pat. No. 2,968,649 discloses a fluoroelastomeric terpolymer consisting of 97 to 65 wt % VdF and HFP units and 3 to 35 wt % tetrafluoroethylene (denoted as TFE hereinafter) units, the VdF and HFP units being present in a weight ratio within the range of 2.33:1.0 to 0.667:1.0. Japanese Patent Publication No. 18957/1973 teaches a fluoroelastomeric terpolymer containing 90 to 70 wt % VdF and HFP units and 10 to 30 wt % TFE units and having a weight ratio of VdF to HFP in the range of 1.6:1 to 4:1. U.S. Pat. No. 4,123,603 discloses a fluoroelastomeric terpolymer of 57 to 61 wt % VdF units, 27 to 31 wt % HFP units and 10 to 14 wt % TFE.

Furthermore, there have been proposals to improve the processability of fluoroelastomers by employing specific preparation methods. For example, U.S. Pat. No. 3,801,552 and U.K. Pat. No. 1,384,398 disclose a process for preparing a fluoroelastomer by means of suspension polymerization in an aqueous medium containing liquid monomers or monomers dissolved in a liquid halogenated hydrocarbon in the presence of a polymerization initiator. Fluoroelastomers obtained from this process show improved processability and low Mooney viscosity in comparison with a conventional fluoroelastomer having the same inherent viscosity value. However, although some of these fluoroelastomers show a relatively high molecular weight, the mechanical properties and compression set characteristics thereof are not adequately improved.

U.S. Pat. No. 3,845,024 teaches a continuous cascade process employing two reactors for preparing a fluoroelastomer having a bimodal molecular weight distribution by means of emulsion polymerization. According to the disclosure, the final blended fluoroelastomer which has a bimodal molecular weight distribution consists of a high molecular weight copolymer having an inherent viscosity (dl/g) of 1.5 to 3 and a low molecular weight copolymer having an inherent viscosity (dl/g) of 0.1 to 0.8, while the final fluoroelastomer has an inherent viscosity (dl/g) of 0.4 to 1.5. This fluoroelastomer has improved processability and a relatively high molecular weight in comparison with the conventional fluoroelastomer. However, the mechanical properties and compression set characteristics thereof are not improved to a satisfactory level.

As shown in the prior art described above, compression set and elongation properties are generally incompatible with each other because a decrease in compression set results in a decrease in elongation for a fluoroelastomer. Similarly, a high molecular weight is contrary to good processability. It has, therefore, been difficult to simultaneously satisfy these properties.

SUMMARY OF THE INVENTION

It is an object of the present invention to provide a novel vinylidene fluoride fluoroelastomer showing excellent characteristics in both compression set and elongation, and showing good processability in spite of a high molecular weight. Other mechanical properties, such as tensile strength and resistance to the formation and growth of cracks are also improved and shown in detail hereinafter.

The present invention is directed to a vinylidene fluoride fluoroelastomer containing 65 to 100 wt % of VdF and HFP units and 35 to 0 wt % of TFE units wherein the improvement is characterized in that (a) the weight ratio of VdF units to HFP units is in the range of 80:20 to 50:50, (b) the intrinsic viscosity (ml/g) is in the range of 250 to 500, (c) the ratio ($\overline{Mw}/\overline{Mn}$) of weight-average molecular weight (Mw) to number-average molecular weight (Mn) is in the range of 2 to 12, and (d) said fluoroelastomer has a bimodal molecular weight distribution of which the ratio ($h_2/h_1$) of the peak-height ($h_2$) corresponding to a higher molecular weight to the peak-height ($h_1$) corresponding to a lower molecular weight shown by the chart of gel permeation chromatography is in the range of 0.8 to 4.0.

The present fluoroelastomer, as illustrated above, has improved properties in compression set and elongation. For example the present fluoroelastomer containing 53 wt % VdF units, 25 wt % HFP units and 22 wt % TFE units has an intrinsic viscosity (ml/g) of 350, a ratio $\overline{Mw}/\overline{Mn}$ of 6, and a ratio $h_2/h_1$ of 3.4 and shows an elongation value of 260% or more and a compression set value of 18% in comparison with an elongation of 200% shown by the presently marketed standard fluoroelastomer having a compression set of 20%.

In addition, even though having a higher inherent viscosity (ml/g) of 250 to 500, the present fluoroelastomer has a low Mooney viscosity of at most about 100 which is similar to the conventional terpolymerized fluoroelastomer having a normal inherent viscosity. As a result, the present fluoroelastomer shows good processability in spite of a higher molecular weight.

DETAILED DESCRIPTION OF THE INVENTION

Figure 1:
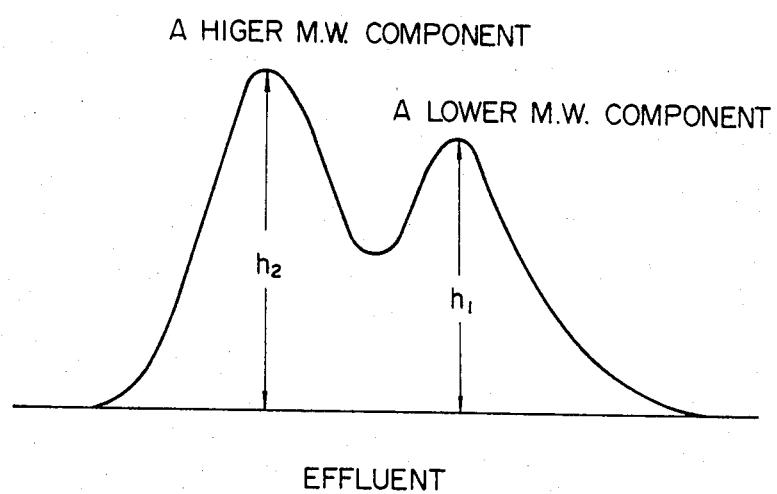
FIG. 1 shows a typical chart of a molecular weight distribution of the present fluoroelastomer by gel permeation chromatography analysis.

The present fluoroelastomer contains 65 to 100 wt % of VdF and HFP units and 35 to 0 wt % of TFE units, and the weight ratio of VdF to HFP units is in the range of 80:20 to 50:50. When the amount of TFE units is higher than the above, the product loses its elastomeric property and shows a plastic property similar to the conventional elastomer. When the amount of HFP units is higher than the above, it is difficult to obtain a fluoroelastomer having the higher molecular weight which is an object of the present invention and, when the HFP amount is lower, the product becomes plastic rather than elastic. A preferable weight ratio of VdF to HFP units, in the case of a copolymer of VdF and HFP units, is in the range of 55:45 to 70:30. In the case of preferable terpolymers of VdF, HFP and TFE units, the weight ratio of VdF and HFP units to TFE units is in the range of 70:30 to 90:10, and the weight ratio of VdF units to HFP units is 75:25 to 50:50.

The present fluoroelastomer has an extremely high intrinsic viscosity (ml/g) (denoted as $[\eta]$ hereinafter) of 250 to 500, preferably 250 to 450, more preferably 250 to 300. In general, the $[\eta]$ of conventional fluoroelastomers is controlled to below 100 in due consideration of processability. The higher the value of $[\eta]$, the harder the conventional fluoroelastomer becomes, resulting in more difficult banding of the fluoroelastomer on the mixing-roll. In fact, it is substantially impossible to roll-mix a fluoroelastomer having an $[\eta]$ of 220 or more. In conventional fluoroelastomers, Mooney viscosity, which is a measure of processability, increases in proportion to $[\eta]$. On the other hand, the present fluoroelastomer has a high $[\eta]$ of 250 or more, shows a constant Mooney viscosity of about 70 to 120 ($ML_{1+10}$ 121° C.) which is not in proportion to $[\eta]$, and yet does not show tackiness to the mixing-roll. The present fluoroelastomer, therefore, shows excellent processability in banding on the mixing roll without showing tackiness and in incorporating components such as carbon black, an acid acceptor and the like. In other words, the present fluoroelastomer shows good processability in spite of the high molecular weight.

In the present invention, when the value of $[\eta]$ is lower than 250, even if the other requirements are satisfied, the improvement in mechanical properties, compression set and dynamic properties is inadequate. The value of compression set changes sharply with an inflection point at an $[\eta]$ of 250. As described above, the present fluoroelastomer simultaneously has excellent properties in both compression set and elongation. Compression set values for the present fluoroelastomer are superior to the conventional marketed copolymer. When the value of $[\eta]$ is higher than 500, good processability is lost and it is difficult to use the fluoroelastomer.

Molecular weight distribution is generally expressed by the ratio ($\overline{Mw}/\overline{Mn}$) of a weight average molecular weight ($\overline{Mw}$) to a number average molecular weight ($\overline{Mn}$). The ratio ($\overline{Mw}/\overline{Mn}$) of the present fluoroelastomer is in the relatively narrow range of 2 to 12 in spite of a biomodal molecular weight distribution. The preferable ratio is in the range of 4 to 12 and the more preferable ratio is from 4 to 10.

The present fluoroelastomer has a bimodal molecular weight distribution which is composed of a higher molecular weight component and a lower molecular weight component. The weight average molecular weights ($\overline{Mw}$) of these two components are in the range of $50-250\times10^4$ and $5-50\times10^4$ corresponding to the higher molecular weight component and the lower molecular weight component, respectively. The feature of the bimodal distribution of the present fluoroelastomer is shown in FIG. 1 which is a chart of gel permeation chromatography.

In FIG. 1, two peaks ($h_2$) and ($h_1$) correspond to the higher molecular weight component and the lower molecular weight component, respectively. The ratio ($h_2/h_1$) of the two peak-heights is in the range of 0.8 to 4.0, preferably 1.2 to 2.4 and this ratio is an important factor in the present invention because, in addition to $[\eta]$, the ratio $h_2/h_1$ affects the balance of processability, mechanical properties, compression set and resistance to the formation and growth of cracks.

The value of $[\eta]$ in the present invention is measured using a methylethylketone solution of the fluoroelastomer with a capillary viscometer at 35° C. according to the provisions of JIS K2283 (ASTM D445).

The values of $\overline{Mw}$, $\overline{Mn}$, $h_2$, $h_1$ and $h_2/h_1$ are measured and calculated from the chart of gel permeation chromatography (GPC).

The GPC measurements are carried out under the following conditions and apparatus:

| | |
|---|---|
| Liquid chromatograph: | LC-3A type (SHIMADZU CORPORATION, JAPAN) |
| Column: | KF-80M (two columns) KF-800P (precolumn) (SHOWA DENKO K.K., JAPAN) |
| Detector: | ERC-7510S (ERMA INC., JAPAN) |
| Integrator: | 7000A (Division volume 0.1 mm) (SYSTEM INSTRUMENTS CO., LTD.) |
| Developing solvent: | tetrahydrofurane |
| Concentration: | 0.1 weight % |
| Temp.: | 35° C. |
| Standard polymer for a calibration curve | highly homogeneous polystyrenes ($\overline{Mw}/\overline{Mn} \leq 1.2$ (max) (TOYO SODA MANUFACTURING CO., LTD. JAPAN) |

For preparing a fluoroelastomer, emulsion, suspension and solution polymerization methods are known. Among these methods, the preferable one to prepare the present fluoroelastomer is the suspension polymerization method which can prepare the fluoroelastomer in one step. It is also possible to prepare the present fluoroelastomer by mechanical blending of high and lower molecular weight components which are prepared by suitable methods, respectively.

The suspension polymerization method employed in the present invention is illustrated in more detail below. A liquid monomer mixture or monomer mixture dissolved in an inactive organic solvent is dispersed in water containing a suspension stabilizer. If necessary, a chain transfer agent may be added to the inactive organic solvent. Polymerization is initiated by the addition of an oil-soluble catalyst under 1-100 kg/cm²-G at 0°-130° C. During the polymerization, additional monomer mixtures are charged to the polymerization system to maintain a constant pressure. It is also possible and desirable to conduct partition-additions of the catalyst during the polymerization. It is preferable that the amount of the catalyst be reduced smoothly or step by step at every addition. The polymerization is preferably carried out under the conditions of 50° to 70° C. and 5 to 50 kg/cm²-G.

The composition of the monomer units in the final product fluoroelastomer is arranged by the proportion of monomers in the monomer mixtures employed at the start of the polymerization and during the polymerization procedure. The proportion of monomers and the component of each of the monomer units are analyzed using gas chromatography and 19$^F$NMR, respectively.

As an inactive organic solvent, one having no carbon-hydrogen bond which easily induces a chain transfer may be utilized. Preferable compounds are perfluorocarbons such as perfluorocyclobutane, perfluorodimethylcyclobutane and perfluorokerosene, and chlorofluorocarbons such as 1,1,2-trichloro-1,2,2-trifluoroethane, 1,2-dichloro-1,1,2,2-tetrafluoroethane, trichlorofluoromethane and dichlorodifluoromethane.

As the suspension stabilizer, there may be used methylcellulose, starch, polyvinylalcohol, carboxymethylcellulose, bentonite, talc and the like. As an oil-soluble catalyst, preferred are dialkylperoxydicarbonates such as diisopropyl peroxydicarbonate and di-n-propyl-peroxydicarbonate, peroxyester compounds such as t-butylperoxyisobutylate and t-butylperoxypivalate, diacylperoxides such as dipropionylperoxide and di[-perfluoro (or chlorofluoro) acyl]peroxides such as di(-perfluoropropionyl)peroxide, di(perfluorobutylyl)-peroxide and di(trichlorooctafluorohexanoyl)peroxide. The di[perfluoro (or chlorofluoro) acyl]peroxides are preferable because the obtained fluoroelastomer shows more excellent heat resistance.

It is also possible to use a chain transfer agent such as methanol, ethanol, isopentane, diethylmaronate carbontetrachloride and the like in order to arrange the molecular weight.

The present fluoroelastomer can be cured by using an ordinary curing method such as a diamine, peroxide or polyol method. As the polyol curing method is generally conducted in the field of sheets such as O-rings and diaphragms which demanded excellent compression set, the polyol method is illustrated below as one example. The present fluoroelastomer is mixed by an open roll mill or a Banbury mixer together with an acid-acceptor, a polyhydroxy compound, a curing accelerator and, if necessary, a filler and then is cured.

As an acid-acceptor, there may be used a divalent metal oxide or hydroxide such as an oxide or hydroxide of calcium, magnesium, zinc or lead. The amount of the acid-acceptor used is in the range of 2 to 30 parts by weight per 100 parts by weight of the fluoroelastomer. As a polyhydroxide compound, there may be used hydroquinone, bisphenol A, bisphenol AF, 4,4'-dihydroxydiphenylmethane, 2,2-bis(4-hydroxyphenyl)butane and the like, used in an amount of 0.5 to 5 parts by weight per 100 parts by weight of the fluoroelastomer.

As a curing accelerator, preferred are tert-onium salt compounds such as tetramethyl, tetraethyl, tetrapropyl or tetrabutylammonium chloride, tetrabutylammonium bromide and tetrabutyl, benzyltriphenyl or benzyltrioctylphosphonium chloride and the like, used in an amount of 0.2 to 10 parts by weight per 100 parts by weight of the fluoroelastomer.

As a filler, there may be used, for example, carbon black, silica, clay, talc and the like, if necessary.

A press curing operation may be conducted under 100° to 200° C., 20 to 100 kg/cm$^2$-G and 10 to 180 minutes. The post-curing operation may be conducted under conditions of 150° to 300° C. and 0 to 30 hours.

The present fluoroelastomer has advantages such as a excellent heat resistance, solvent resistance and chemical resistance as with the conventional fluoroelastomer, and further shows excellent characteristics in mechanical properties such as tensile strength and elongation, compression set, processability, and resistance to the formation and growth of cracks.

The present invention is more specifically described and explained by the following examples which, however, are not intended to limit the scope of the invention. In the examples, all parts and percent (%) are by weight except as otherwise noted.

The fluoroelastomer is cured by the standard polyol curing method under the following conditions.

| | |
|---|---|
| A fluoroelastomer: | 100 parts |
| Magnesium oxide: | 3 parts |
| Calcium hydroxide: | 6 parts |
| Bisphenol AF: | 2 parts |
| Benzyltriphenylphosphonium chloride: | 0.6 part |
| M.T. Carbon black: | 30 parts |
| Mixing: | two roll-mill |
| First press-curing: | 177° C. × 10 min. |
| Post oven-curing: | 232° C. × 24 hours |

Tensile strength and elongation are measured with dumbell test pieces (No. 3) with a thickness of 2 mm prepared from the samples of a cured sheet obtained from the above curing using a universal tensile tester (Toyo Seiki Seisaku-Sho, Ltd. Japan) at a rate of 50 cm/min. according to the provisions of JIS K6301.

Compression set is measured with an O-ring (No. P-24 type) that is maintained at 200° C. under a deflection of 25% for 72 hours followed by standing at a room temperature for 30 minutes, using a thickness gauge (Kyoto Kobunshi Keiki Co., Ltd. Japan) according to the provisions of JIS K6301.

Resistance to the formation and growth of cracks is measured with a sample according to the provisions of JIS K6301 using a de Mattia machine, and shown by the number of 90° flexings required to produce a crack with a length of 10 mm.

Rebound resilience is measured with a sample (8×8×4mm) according to the provisions BS903 at 23° C. using the Resilience Testor (Toyo Seiki Seisaku-Sho, Ltd. Japan).

EXAMPLE 1

A fifty liter autoclave provided with a mechanical stirrer is thoroughly replaced with $N_2$ gas and then evacuated. After repeating the replacing evacuation procedure three times, the autoclave is evacuated as fully as possible, and then charged with 18.56 kg of pure water purged with $N_2$ gas, 8.33, kg of 1,1,2-trichloro-1,2,2-trifluorethane (noted as R-113 hereinafter) and 6.2 g of methyl cellulose as a suspension stabilizer, and kept at 50° C. with 476 r.p.m. of agitation. The inner pressure of the autoclave becomes 16.4 kg/cm$^2$-G by the charge of a monomer mixture of 26.5% of VdF, 66.9% of HFP and 6.6% of TFE.

Polymerization is initiated and progressed by partition-additions of a catalyst solution (denoted as FPO hereinafter) prepared by dissolving 5% of di(perfluorobutylyl) peroxide in R-113. Details of the addition are shown by Ⓐ in FIG. 2. When the inner pressure is reduced to 16.0 kg/cm$^2$-G by the progress of the reaction, and additional monomer mixture of 44.7% VdF, 31.7% HFP and 23.6% TFE is charged to return to the initial pressure.

After a reaction time of 14 hours, residual monomer mixtures are removed and the obtained suspension is dehydrated with a centrifugal separator, washed thoroughly and vacuum-dried at 100° C. The yield of the fluoroelastomer is 10.4 kg.

The obtained fluoroelastomer has 52.6% VdF units, 24.6% HFP units and 22.8% TFE units (by the analysis of $^{19}$FNMR), [η] of 268, $h_2/h_1$ of 1.77 and $\overline{M}w/\overline{M}n$ of 6.5.

The fluoroelastomer is subjected to a polyol-curing under standard conditions as described hereinbefore.

The obtained fluorelastomer shows excellent processability in banding on the mixing roll without showing tackiness and in incorporation of components such as carbon black, magnesium oxide, calcium hydroxide and the like.

The other properties are shown in Table 1.

EXAMPLE 2

Figure 2:
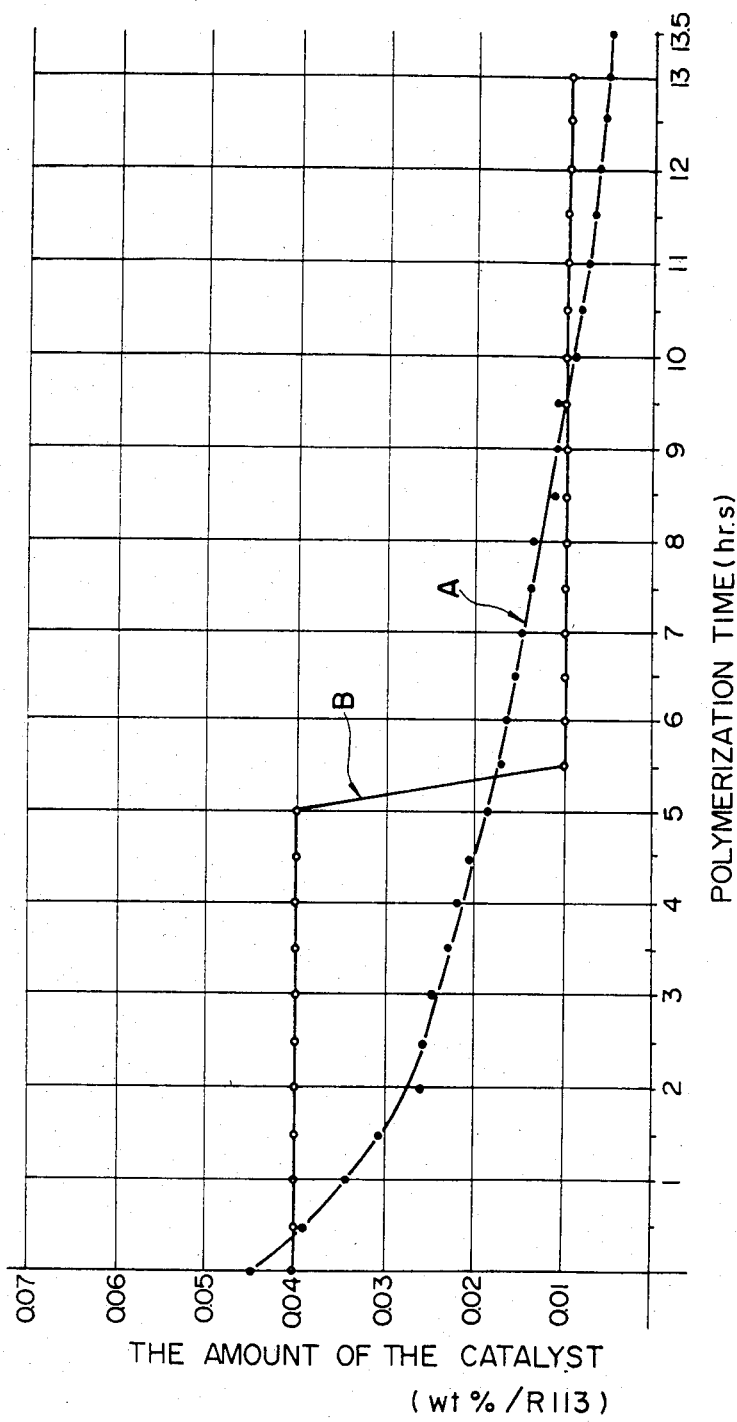
FIG. 2 shows the relation of the amount of the polymerization catalyst charged to the polymerization system with the time of the polymerization in Examples 1 and 2.

The polymerization reaction is conducted for 13.25 hours by using the same method as in Example 1 except that methylcellulose is employed in an amount of 8.4 g instead of 6.2 g, the initial inner pressure is arranged to 16.0 kg/cm$^2$-G by initially charging a monomer mixture of 26.4% VdF, 67.1% HFP and 6.5% TFE, the partition-additions of FPO are conducted by the method of Ⓑ in FIG. 2 instead of Ⓐ and the inner pressure is maintained by charging an additional monomer mixture of 45.7% VdF, 32.0% HFP and 22.3% TFE when the inner pressure reduces to 15.5 kg/cm$^2$-G.

The yield is 13.9 kg. The fluoroelastomer has 52.6% VdF units, 24.1% HFP units and 23.3% TFE units, [$\eta$] of 247, h$_2$/h$_1$ of 2.07 and $\overline{Mw}/\overline{Mn}$ of 8.9, and has excellent rolling properties similar to the product of Example 1. The other properties are shown in Table 1.

EXAMPLE 3

Polymerization similar to Example 1 is repeated for 9 hours and 30 minutes except that 8,54 kg of R-113 and 18.6 g of methylcellulose are used, the initial inner pressure is arranged to 15 kg/cm$^2$-G by charging a monomer mixture of 28.0% VdF, 65.7% HFP and 6.3% TFE, 85.4 g of a catalyst solution (devoted as IPP hereinafter) prepared by dissolving 5% of diisopropylperoxydicarbonate in R-113 is charged collectively and the inner pressure is maintained by charging an additional monomer mixture of 44.3% VdF, 32.4% HFP and 23.4% TFE at a pressure of 14.5 kg/cm$^2$-G. The yield of the fluoroelastomer is 4.5 kg. The other results are shown in Table 1.

EXAMPLE 4

Polymerization similar to Example 3 is carried out for 4.5 hours except that 18.6 g instead of 9.3 g of methylcellulose is used a suspension stabilizer, 341.6 g instead of 85.4 g of IPP is used, the initial monomer mixture is composed of 27.5% VdF, 66.7% HFP and 5.8% TFE, and the additional monomer mixture is composed of 45.0% VdF, 32.1% HFP and 22.9% TFE. The yield of fluoroelastomer is 8 kg. The other results are shown in Table 1.

EXAMPLE 5

Polymerization similar to Example 1 is carried out for 3.5 hours except that 8,54 kg instead of 8.33 kg of R-113 is used, methylcellulose is used in an amount of 9.3 g instead of 6.2 g, the initial inner pressure is arranged to 17 kg/cm$^2$-G by charging an initial monomer mixture of 24.5% VdF, 69.6% HFP and 5.9% TFE, a catalyst comprising 170.8 g of IPP is collectively charged, and the inner pressure is maintained by charging an additional monomer mixture of 50.5% VdF, 28.1% HFP and 21.4% TFE at an inner pressure of 16.5 kg/cm$^2$-G. The yield of fluoroelastomer is 4.4 kg. The other results are shown in Table 1.

TABLE 1

| | Fluoroelastomer Properties | | | | |
|---|---|---|---|---|---|
| | Ex. 1 | Ex. 2 | Ex. 3 | Ex. 4 | Ex. 5 |
| Composition of the fluoroelastomer | | | | | |
| VdF units (%) | 52.6 | 52.6 | 53.3 | 56.1 | 55.5 |
| HFP units (%) | 24.6 | 24.1 | 20.0 | 20.4 | 25.2 |
| TFE units (%) | 22.8 | 23.3 | 26.7 | 23.5 | 19.3 |
| ($\eta$) | 268 | 250 | 365 | 279 | 255 |
| h$_2$/h$_1$ | 1.77 | 2.07 | 3.65 | 2.45 | 1.48 |
| Mw/Mn | 6.5 | 8.9 | 5.3 | 2.8 | 3.1 |
| Mooney viscosity (ML$_{1+10}$ 121° C.) | 117 | 100 | 72 | 80 | 92 |
| Mechanical properties | | | | | |
| Tensile strength (kg/cm$^2$) | 175 | 164 | 204 | 167 | 175 |
| Elongation (%) | 280 | 240 | 240 | 260 | 250 |
| Compression set (%) | 17 | 19 | 17 | 21 | 19 |
| Resistance to the formation and growth of cracks (number of 90° flexes) | 9,000 | 10,000 | 7,000 | 8,000 | 9,000 |
| Processability in banding, tackiness and incorporation of components on the mixing roll | excellent | excellent | good | excellent | excellent |

EXAMPLE 6

A fifteen liter autoclave provided with a mechanical stirrer is thoroughly replaced with nitrogen gas and then evacuated. After repeating the replacing-evacuation procedure three times, the autoclave is evacuated as fully as possible, and then charged with 5800 g of pure water purged with nitrogen gas, 2670 g of R-113 and 2.9 g of methylcellulose as a suspension-stabilizer, and then maintained at 50° C. with 500 rpm of agitation. A monomer mixture consisting of 27.2% of VdF, 66.7% of HFP and 6.1% of TFE is charged into the autoclave. The inner-pressure of the autoclave reaches 15.3 kg/cm$^2$-G by the charging procedure. Polymerization is initiated by the addition of 8 g of FPO. When the inner pressure is reduced to 14.8 kg/cm$^2$-G by progress of the polymerization, an additional monomer mixture of 45.7% of VdF, 30.5% of HFP and 23.8% of TFE is charged in order to return the pressure to 15.3 kg/cm$^2$-G. This additional charge is repeated during the polymerization. On the other hand, ten grams of FPO is supplied at 30 minute intervals. FPO is used in a total amount of 218 grams during the 11 hours polymerization. After polymerization, the residual monomer mixture is removed and the polymerization is stopped.

The obtained suspension is dehydrated with a centrifugal separator, washed thoroughly and vacuum-dried at 100° C. to obtain 2.5 kg of fluoroelastomer.

The obtained fluoroelastomer has 52.2% of VdF units 23.2% of HFP units and 24.6% of TFE units (by the analysis of $^{19}$FNMR), $[\eta]$ of 300, $h_2/h_1$ of 1.8 and $\overline{M}w/\overline{M}n$ of 4.8.

The fluoroelastomer is subjected to a polyol-curing under the standard conditions described hereinbefore.

The fluoroelastomer shows excellent processability in tackiness on the mixing roll and in incorporation of components such as carbon black, magnesium oxide and calcium hydroxide, etc., and has a Mooney viscosity ($ML_{1+10}$ 121° C.) of 100. The other properties are shown in Table 2.

COMPARATIVE EXAMPLE 1

Polymerization is conducted for 6 hours by using the same method described in Example 6 except that the initially charged monomer mixture consists of 24.4% of VdF, 70.0% HFP and 5.6% of TFE, 160 g of FPO is collectively charged, the additionally charged monomer mixture consists of 45.5% of VdF, 30.5% of HFP and 24.0% of TFE, and a polymerization temperature of 25° C. is employed instead of 50° C. One kg of the fluoroelastomer is obtained by this method.

The fluoroelastomer obtained consists of 53.4% VdF units, 24.8% HFP units and 21.8% TFE units, and shows $[\eta]$ of 200, $h_2/h_1$ of 0.8 and $\overline{M}w/\overline{M}n$ of 7.1.

The fluoroelastomer is cured by the same method as in Example 6 and shows a Mooney viscosity ($ML_{1+10}$ 121° C.) of 85. The other properties are shown in Table 2.

COMPARATIVE EXAMPLE 2

A fifteen liter autoclave provided with a mechanical stirrer is thoroughly replaced with nitrogen gas and then evacuated. After repeating the replacement/evacuation procedure three times, the autoclave is evacuated as fully as possible, and then charged with 7500 g of pure-water purged with nitrogen gas, 22.5 g of ammonium persulfate and 22.5 g of ammonium perfluorooctanoate as an emulsifier, and maintained at 85° C. A monomer mixture of 38.4% VdF, 39.2% HFP and 22.4% TFE is charged into the autoclave. The inner-pressure of the autoclave becomes 8 kg/cm²-G by this charging procedure. When the inner-pressure is reduced to 7 kg/cm²-G by progress of the polymerization, an additional monomer mixture of 43.4% VdF, 33.0% HFP and 23.6% TFE is charged in order to maintain the inner-pressure at 8 kg/cm²-G. After this additional charge is repeated for 1 hour, the residual monomers are removed and the polymerization is stopped.

The fluoroelastomer is obtained from the resultant emulsion by salting-out with the addition of a solution of magnesium chloride, washed thoroughly, vaccuum-dried at 100° C. The yield of fluoroelastomer is about 1.3 kg.

The fluoroelastomer has 45.9% VdF units, 32.7% HFP units and 21.4% TFE units (by the analysis of [19]NMR), shows $[\eta]$ of 80 and $\overline{M}w/\overline{M}n$ of 27.4 and does not show a bimodal molecular weight distribution.

The fluoroelastomer cured by the same method as Example 6 shows a Mooney viscosity ($ML_{1+10}$ 121° C.) of 80. The other properties are shown in Table 2.

COMPARATIVE EXAMPLE 3

The procedure in Comparative Example 2 is repeated except that a monomer mixture of 39.9% VdF and 60.1% HFP and a monomer mixture of 55.6% VdF and 44.4% HFP are used as the initially charged monomer and the additionally charged monomer, respectively, and reaction conditions of 70° C. for 3 hours are employed instead of 85° C. and 1 hour. The yield of the fluoroelastomer is 1.9 kg. The fluoroelastomer has 52.9% VdF units and 47.1% HFP units by $^{19}$FNMR analysis, shows $[\eta]$ of 70 and $\overline{M}w/\overline{M}n$ of 7.9 and does not show the bimodal molecular weight distribution. The other properties of the cured elastomer are shown in Table 2.

TABLE 2

| | Fluoroelastomer Properties | | | |
|---|---|---|---|---|
| | Mooney viscosity ($ML_{1+10}$ 121° C.) | Tensile strength [kg/cm²] | Elongation [%] | Compression set [%] | Resistance to the formation of cracks (number of flexes) |
| Example 6 | 100 | 185 | 250 | 18 | 10,000 |
| Comp. Ex. 1 | 85 | 170 | 260 | 22 | 9,000 |
| Comp. Ex. 2 | 80 | 175 | 280 | 36 | 2,000 |
| Comp. Ex. 3 | 46 | 170 | 210 | 21 | 2,000 |

EXAMPLE 7

A procedure similar to that of Example 6 is repeated employing the monomer mixture and polymerization conditions shown in Table 3. The results are also shown in Table 3.

TABLE 3

| | VdF | HFP | TFE |
|---|---|---|---|
| Composition | | | |
| Initial monomer (wt %) | 27.2 | 66.7 | 6.1 |
| Additional monomer (wt %) | 45.7 | 30.5 | 23.8 |
| Obtained elastomer (wt %) | 51.6 | 23.8 | 24.6 |
| Polymerization condition | | | |
| Temp. (°C.) | | 50 | |
| Pure water (g) | | 5800 | |
| R-113 (g) (g) | | 2670 | |
| Catalyst (g) | FPO 163 (additional charge) | | |
| Pressure (kg/cm²-G) | 15.9 | ⇌ 15.4 | |
| Time (hrs) | | 7.5 | |
| Yield of elastomer (kg) | | 2.7 | |
| Properties | | | |
| $[\eta]$ (ml/g) | | 270 | |
| $h_2/h_1$ | | 1.9 | |
| $\overline{M}w/\overline{M}n$ | | 5.9 | |
| Mooney viscosity ($ML_{1+10}$ 121° C.) | | 90 | |
| Tensile strength (kg/cm²) | | 185 | |
| Elongation (%) | | 260 | |
| Compression set (%) | | 19 | |
| Resistance to the formation and growth of cracks (number of flexes) | | 9000 | |

EXAMPLE 8

Polymerization similar to Example 6 is repeated for 18 hours except that methylcellulose is used in an amount of 5.8 g instead of 2.9 g, the initial inner pressure is arranged to 15.5 kg/cm²-G by charging a monomer mixture of 20.8% VdF and 79.2% HFP, the inner pressure is maintained at 15.5 kg/cm$^2$-G by charging an additional monomer mixture of 58.7% VdF and 41.3% HFP reducing the pressure to 15.0 kg/cm$^2$-G and the total amount of FPO charged during the 18 hours of polymerization is 358 g instead of 218 g.

The yield of the fluoroelastomer is 1.3 kg. The other results are shown in Table 4.

EXAMPLE 9

Polymerization similar to Example 8 is carried out for 10 hours except that as a catalyst, 106.8 g of IPP are used collectively, the initial monomer mixture is composed of 26.8% VdF and 73.2% HFP, and the additional monomer mixture has a composition of 58.5% VdF and 41.5% HFP.

The yield of fluoroelastomer is 1.6 kg. The results are shown in Table 4.

TABLE 4

|  | Ex. 8 | Ex. 9 | Ex. 10 |
|---|---|---|---|
| Composition of the fluoroelastomer | | | |
| VdF units (%) | 58.8 | 63.9 | 59.5 |
| HFP units (%) | 41.2 | 36.1 | 40.5 |
| [$\eta$] | 350 | 300 | 400 |
| $h_2/h_1$ | 2.45 | 1.65 | 2.68 |
| $\overline{M}w/\overline{M}n$ | 8.3 | 8.7 | 9.7 |
| Mooney viscosity (ML$_{1+10}$ 121° C.) | 100 | 95 | 120 |
| Mechanical properties | | | |
| Tensile strength (kg/cm$^2$) | 182 | 193 | 186 |
| Elongation (%) | 250 | 250 | 260 |
| Compression set (%) | 13 | 14 | 12 |
| Rebound resilience (%) | 23 | 24 | 26 |
| Processability in banding, tackiness and incorporation of components on the mixing roll | good | excellent | good |

EXAMPLE 10

Polymerization similar to that of Example 8 is carried out for 20 hours except that FPO is charged in an amount of 320 g by partition-additions in which the amount of the catalyst is smoothly reduced at every addition similar with Ⓐ in FIG. 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A fluoroelastomer containing 65 to 100 wt % of vinylidene fluoride units and hexafluoropropylene units and 35 to 0 wt % of tetrafluoroethylene units wherein the fluoroelastomer has the following characteristics:
   (a) the weight ratio of vinylidene fluoride units to hexafluoropropylene units is in the range of 80:20 to 50:50;
   (b) the intrinsic viscosity is in the range of 250 to 500 ml/g;
   (c) the ratio ($\overline{M}w/\overline{M}n$) of weight-average molecular weight ($\overline{M}w$) to number-average molecular weight ($\overline{M}n$) is in the range of 2 to 12; and
   (d) said fluoroelastomer has a bimodal molecular weight distribution, and the ratio ($h_2/h_1$) of the peak-height ($h_2$) of higher molecular weight to the peak-height ($h_1$) of lower molecular weight shown by a chart of gel permeation chromatography is in the range of 0.8 to 4.0.

2. A fluoroelastomer according to claim 1, wherein the ratio of vinylidene fluoride units to hexafluoropropylene units is in the range of 75:25 to 50:50.

3. A fluoroelastomer according to claim 1 wherein the intrinsic viscosity is in the range of 250 to 450 ml/g.

4. A fluoroelastomer according to claim 1 wherein the intrinsic viscosity is in the range of 250 to 300 l ml/g.

5. A fluoroelastomer according to claim 1 wherein the ratio ($\overline{M}w/\overline{M}n$) is in the range of 4 to 12.

6. A fluoroelastomer according to claim 1 wherein said ratio $h_2/h_1$ is from 1.2 to 2.4.

7. A fluoroelastomer according to claim 1, wherein the said fluoroelastomer has a Mooney viscosity (ML$_{1+10}$ 121° C.) in the range of 70 to 120.

8. A fluoroelastomer according to claim 1, wherein said fluoroelastomer contains about 53 wt % vinylidene fluoride units, about 25 wt % hexafluoropropylene units and about 22 wt % tetrafluoroethylene units and has an intrinsic viscosity of about 350 ml/g, a ratio $\overline{M}w/\overline{M}n$ of about 6 and a ratio $h_2/h_1$ of about 3.4.

9. A fluoroelastomer according to claim 1 which is a copolymer of vinylidene fluoride and hexafluoropropylene and has a weight ratio of vinylidene fluoride units to hexafluoropropylene units of 55:45 to 70:30.

10. A fluoroelastomer according to claim 1, which is a terpolymer of vinylidene fluoride, hexafluoropropylene and tetrafluoroethylene and has a weight ratio of vinylidene fluoride and hexafluoropropylene units to tetrafluoroethylene units of 70:30 to 90:10.

11. A fluoroelastomer according to claim 1, wherein the intrinsic viscosity is in the range of 250 to 300 ml/g.

12. A fluoroelastomer according to claim 1, wherein the ratio $h_2/h_1$ is from 1.2 to 2.4.

13. A fluoroelastomer according to claim 1 wherein the ratio ($\overline{M}w/\overline{M}n$) is in the range of 4 to 10.

14. A fluoroelastomer consisting essentially of 65 to 100 wt % of vinylidene fluoride units and hexafluoropropylene units and 35 to 0 wt % of tetrafluoroethylene units wherein the fluoroelastomer has the following characteristics:
   (a) the weight ratio of vinylidene fluoride units to hexafluoropropylene units is in the range of 80:20 to 50:50;
   (b) the intrinsic viscosity is in the range of 250 to 500 ml/g;
   (c) the ratio ($\overline{M}w/\overline{M}n$) of weight-average molecular weight ($\overline{M}w$) to number-average molecular weight ($\overline{M}n$) is in the range of 2 to 12; and
   (d) said fluoroelastomer has a bimodal molecular weight distribution, and the ratio ($h_2/h_1$) of the peak-height ($h_2$) of higher molecular weight to the peak-height ($h_1$) of lower molecular weight shown by a chart of gel permeation chromatography is in the range of 0.8 and 4.0.

* * * * *